Figure 1:
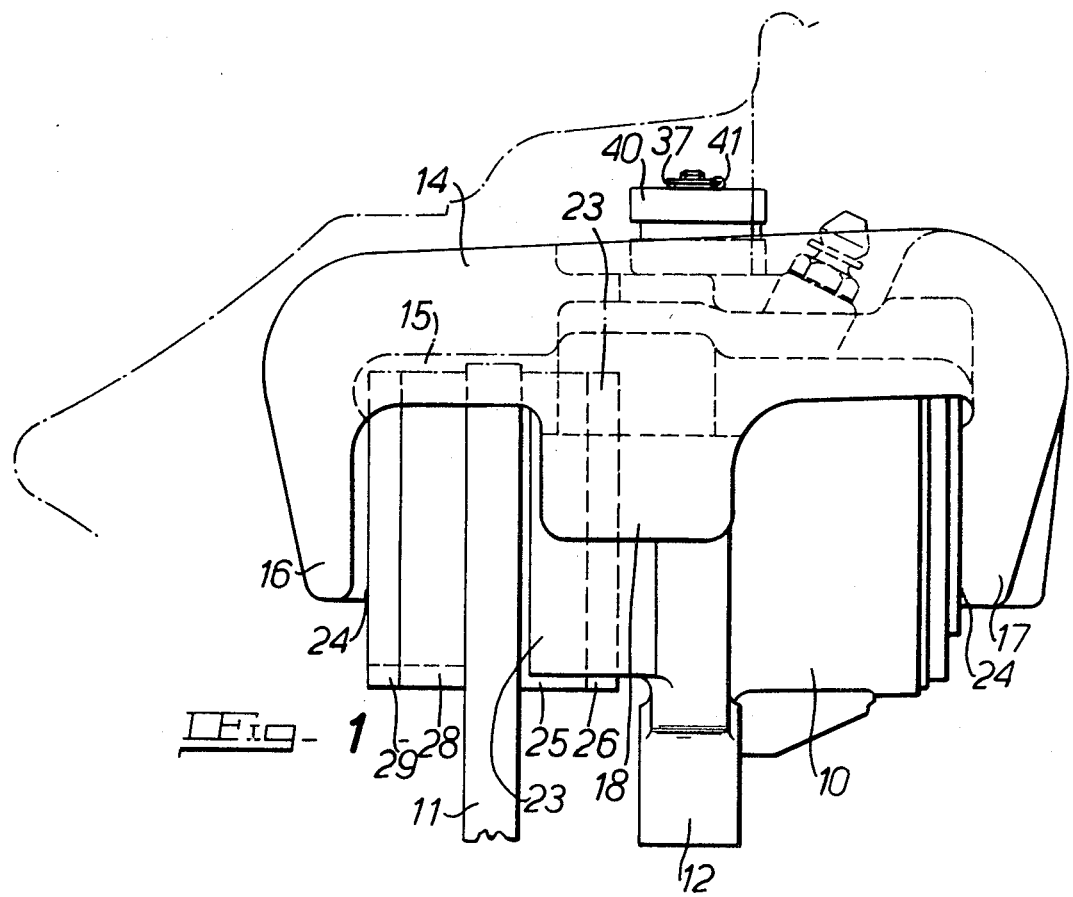

United States Patent
Habgood

[15] 3,651,898
[45] Mar. 28, 1972

[54] DISC BRAKE CALIPER STRUCTURE

[72] Inventor: Gordon A. Habgood, Shipston-on-Stour, England

[73] Assignee: Girling Limited, Tyseley, Birmingham, England

[22] Filed: Oct. 24, 1969

[21] Appl. No.: 868,991

[52] U.S. Cl. ............................ 188/72.5, 188/71.1, 188/73.3
[51] Int. Cl. ..................................................... F16d 55/228
[58] Field of Search ..................... 188/71.1, 72.4, 72.5, 73.3, 188/73.4, 73.5, 73.6

[56] References Cited

UNITED STATES PATENTS

| | | | |
|---|---|---|---|
| 3,065,829 | 11/1962 | Bessler et al. | 188/73.4 X |
| 3,245,500 | 4/1966 | Hambling et al. | 188/73.4 X |
| 3,387,687 | 6/1968 | Eggstein et al. | 188/72.4 |
| 3,428,152 | 2/1969 | Hoenick | 188/72.5 |
| 3,480,116 | 11/1969 | Rath | 188/73.3 |

FOREIGN PATENTS OR APPLICATIONS

| | | | |
|---|---|---|---|
| 1,130,422 | 10/1968 | Great Britain | 188/72.4 |

Primary Examiner—George E. A. Halvosa
Attorney—Scrivener Parker Scrivener and Clarke

[57] ABSTRACT

In a disc brake of the kind in which friction pad assemblies are urged into engagement with opposite faces of a rotatable disc by operation of an hydraulic actuator which applies one friction pad assembly directly to one face of the disc and other friction pad assembly to the opposite face of the disc through a yoke guided to slide relative to a stationary member mounted adjacent to the disc, the yoke comprises a one piece assembly adapted to fit over the stationary member and a portion of the periphery of the disc. The yoke is provided with a pair of spaced flat parallel guiding surfaces of substantial radial depth for direct operative engagement with complementary flat guiding surfaces on opposite sides of the stationary member, and the guiding surfaces on the yoke, at least at one pair of corresponding ends, lead into opposed bearing surfaces for engagement with complementary shoulders on the stationary member.

22 Claims, 11 Drawing Figures

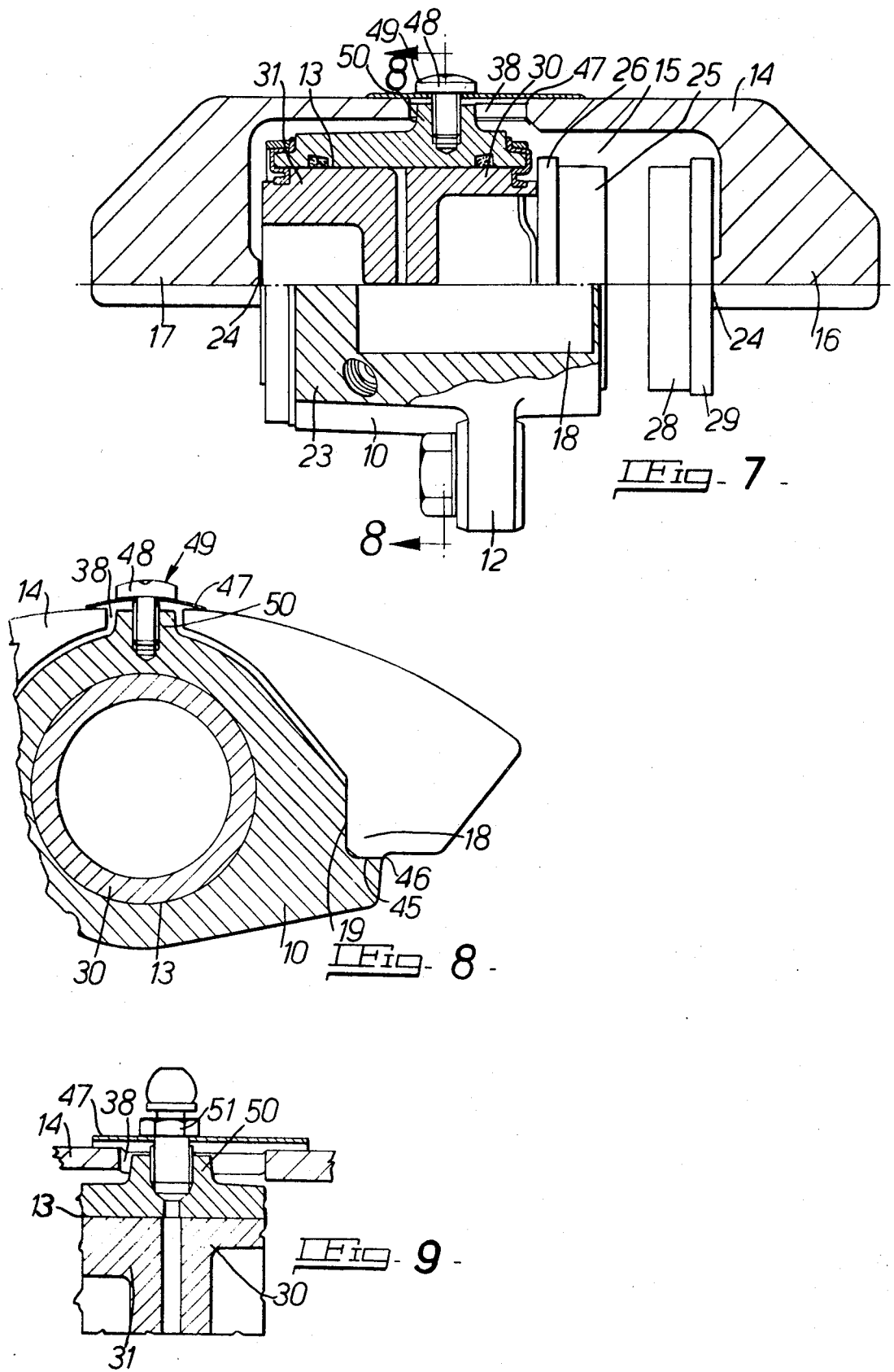

DISC BRAKE CALIPER STRUCTURE

SPECIFIC DESCRIPTION

This invention relates to improvements in disc brakes of the kind in which an hydraulic actuator is adapted to apply a first friction pad assembly directly to an adjacent face of a rotatable disc, and the hydraulic actuator is adapted to apply a second friction pad assembly to the opposite face of the disc through a yoke which is mounted on or in a stationary member for sliding movement in a direction parallel to the axis of the disc. More particularly our invention is concerned with providing an improved yoke for use in a disc brake of the kind set forth.

According to our invention a yoke for use in a disc brake of the kind set forth comprises a one piece assembly adapted to fit over the stationary member and a portion of the periphery of the disc and provided with a pair of spaced flat parallel guiding surfaces of substantial radial depth for direct operative engagement with complementary flat guiding surfaces on opposite sides member, the guiding surfaces on the yoke at least one pair of corresponding ends leading into opposed bearing surfaces for engagement with complementary shoulders on the stationary member.

Preferably the bearing surfaces are located at right angles to the spaced flat parallel guiding surfaces.

The flat parallel guiding surfaces comprise the inner adjacent surfaces of a first pair of spaced lugs which both project away from the plane of the yoke in the same direction, and a second pair of spaced parallel lugs project away from the plane of the yoke in the same direction as the first pair and are spaced outwardly beyond the outer opposite ends of the lugs of the first pair, the lugs of the second pair being disposed between and located inwardly from spaced parallel planes containing the flat parallel guiding surfaces of the lugs of the first pair, and the adjacent inner faces of the lugs of the second pair defining abutment surfaces for engagement with the second pad assembly and with the hydraulic actuator.

This has the advantage that machining of the flat parallel guiding surfaces and the abutment surfaces can be carried out in two separate operations, in directions at right angles to each other, without interfering with the lugs of the other pair.

The first pair of lugs are located at circumferentially opposed positions on opposite sides of a central recess in the yoke which is adapted to accommodate the stationary member and a portion of the periphery of the disc, and the second pair of lugs are located at axially opposite ends of the recess.

Where the bearing surfaces are located at the radially outermost ends of the parallel guiding surfaces, they extend towards each other and when the bearing surfaces are located at the radially innermost ends of the parallel guiding surfaces they extend away from each other in opposite directions.

In either form, when the yoke is installed in a disc brake of the kind set forth, the bearing surfaces are urged into engagement with the complementary shoulders on the stationary member by resilient means acting between the yoke and the stationary member.

The resilient means may comprise spring means acting between the yoke and the stationary member in the form of a coiled compression spring or a plate spring. Alternatively the spring means may comprise a pair of tension springs positioned at circumferentially opposed ends of the brake and acting between the yoke and the stationary member at radially spaced points.

When the bearing surfaces are located at the radially innermost and outermost ends of the parallel guiding surfaces, each pair of bearing surfaces extend towards each other and straddle and engage slidably with complementary spaced shoulders on arms on the stationary member, when the yoke is installed in a brake of the kind set forth.

The shoulders on the stationary member may be located at radially opposite ends of each arm or they may be located at radially opposite ends of opposed lugs extending outwardly from the arms.

Figure 3:
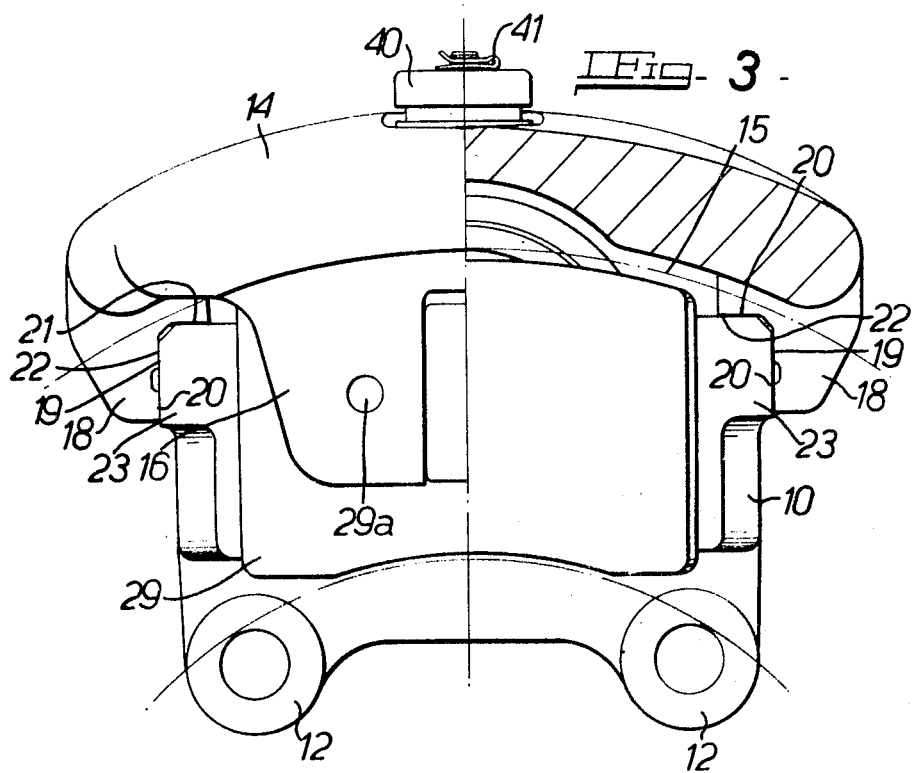
Figure 2:
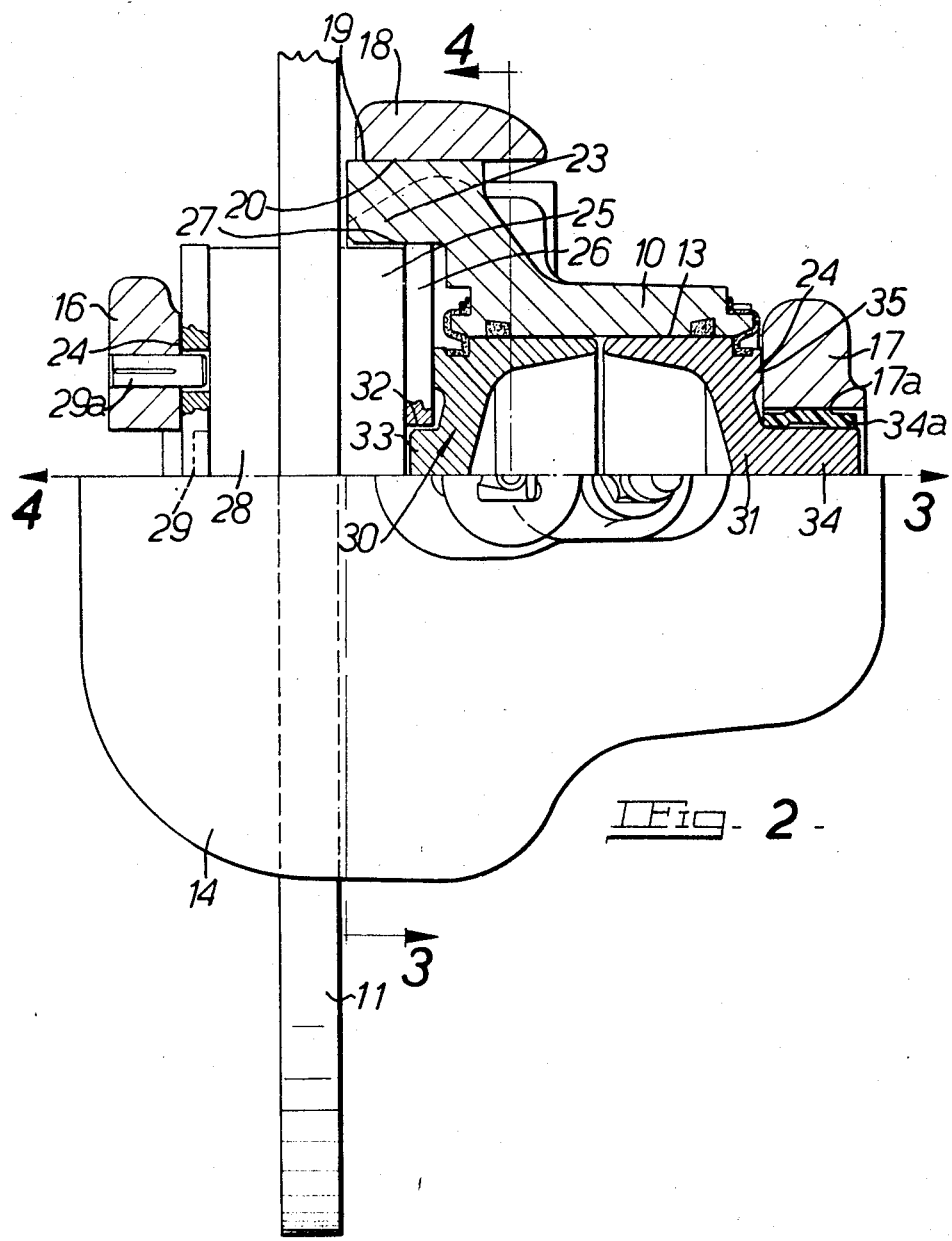
Figure 4:
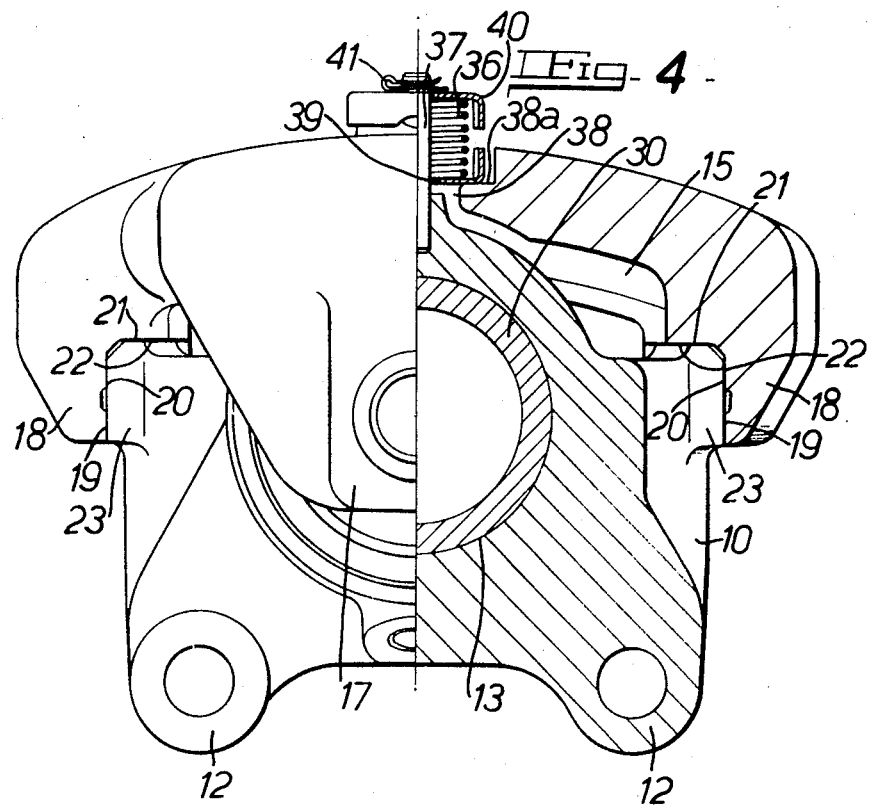
Figure 5:
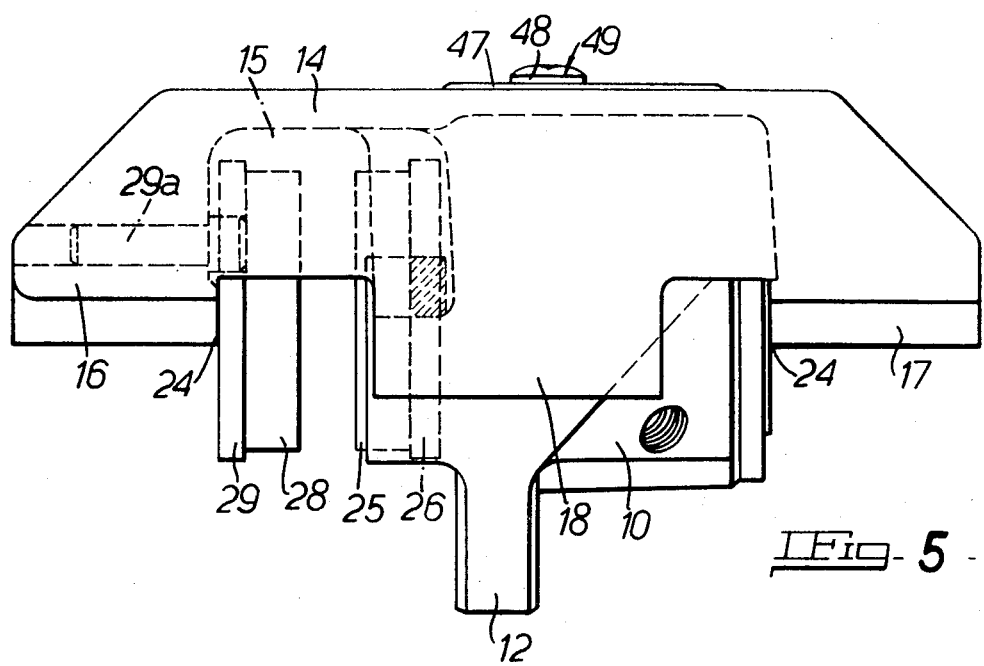
Figure 6:
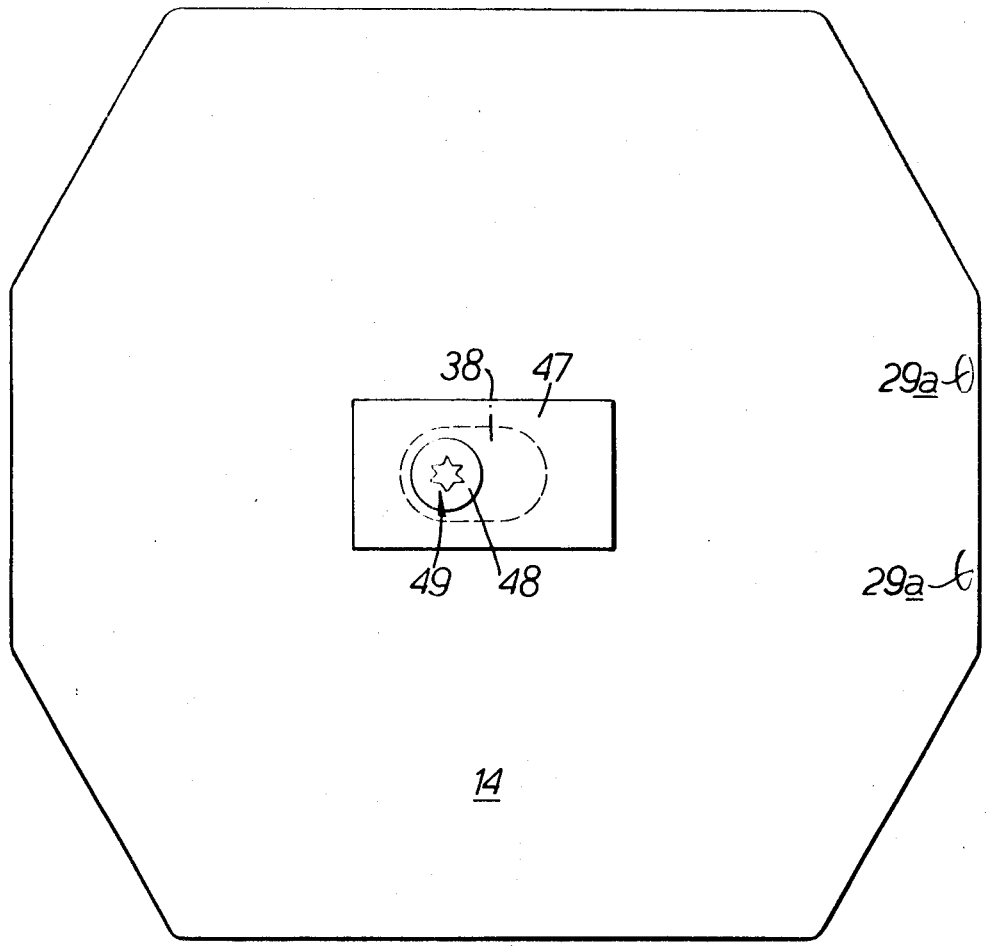
Figure 10:
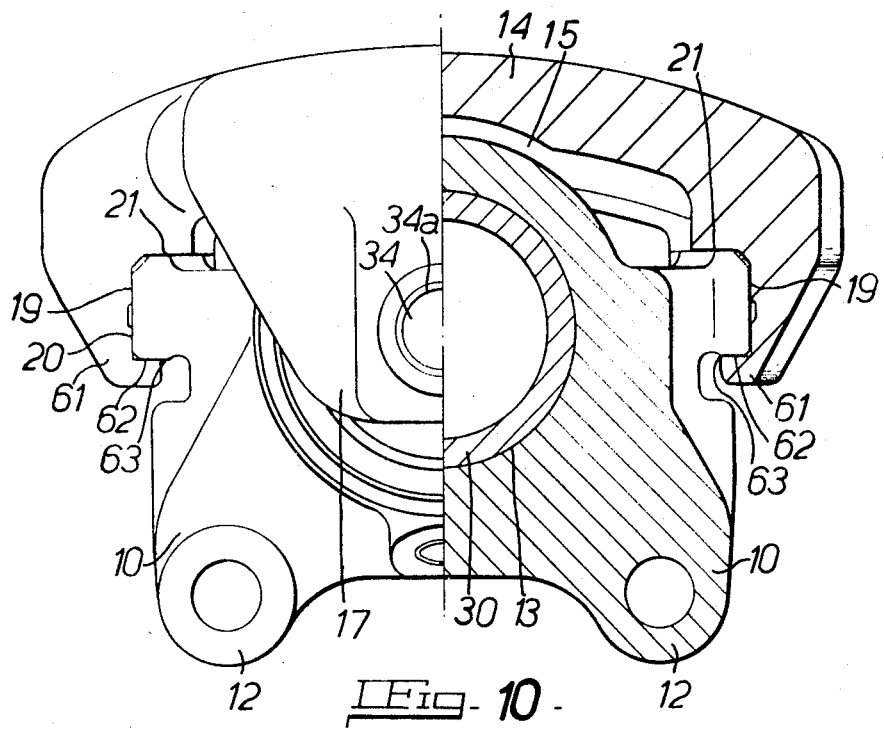
Figure 11:
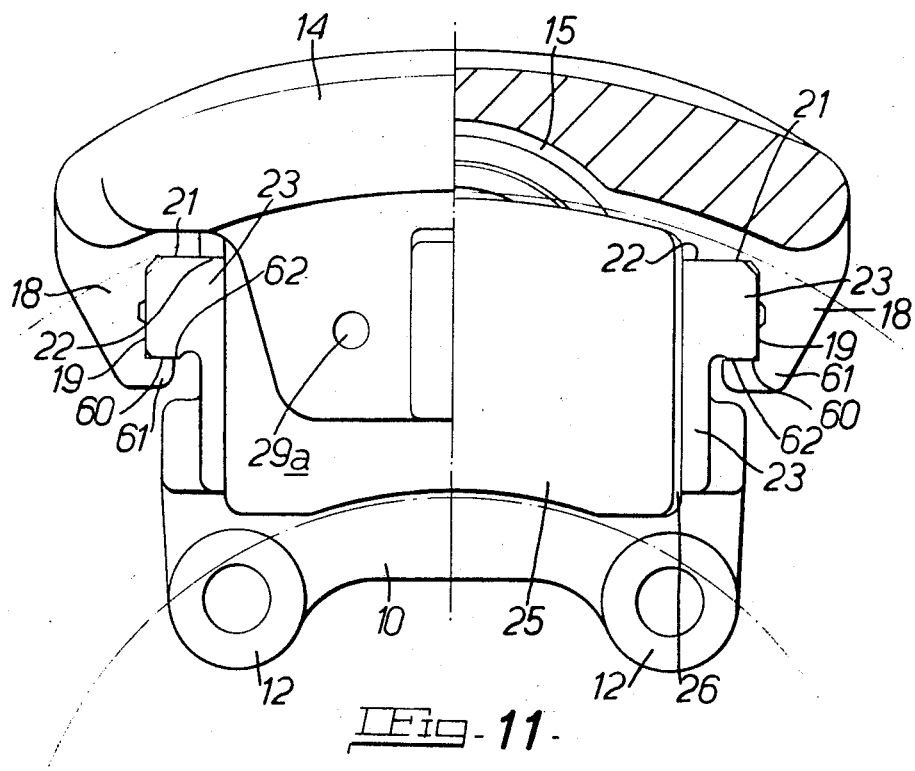

Some disc brakes in accordance with our invention are illustrated in the accompanying drawings in which:

FIG. 1 is a side elevation of one form of disc brake;
FIG. 2 is a plane view including a part section on the axis of the brake actuating mechanism;
FIG. 3 is a part section on the line 3—3 of FIG. 2;
FIG. 4 is a part section on the line 4—4 of FIG. 2;
FIG. 5 is a side elevation of another form of disc brake;
FIG. 6 is a plan view of the same;
FIG. 7 is a major section through the brake illustrated in FIG. 5, taken on the axis of the brake;
FIG. 8 is a section on the line 8—8 of FIG. 7;
FIG. 9 is a fragmentary section similar to FIG. 8 but showing a modification;
FIG. 10 is an end view similar to FIG. 3, but of a further form of brake; and
FIG. 11 is a half sectional view of the opposite end of the brake illustrated in FIG. 10.

In the brake illustrated in FIGS. 1 to 4 of the drawings a stationary member or carrier 10 is mounted on a stationary or nonrotating part at one side of a rotatable brake disc 11. For mounting purposes the carrier has two spaced inwardly projecting lugs 12 to receive securing bolts. The carrier, which is conveniently formed as a casting, or forging incorporates an hydraulic cylinder 13 of which the axis is substantially at right angles to the plane of the disc. The cylinder 13 is conveniently formed as a bore in the carrier.

Slidably mounted on the carrier for movement in a direction parallel to the axis of the disc is a yoke 14 which is preferably formed from a casting or forging having on one side a substantially planar face surrounding a central recess 15 fitting over the carrier and a portion of the periphery of the disc 11. A pair of opposed parallel lugs 16 and 17 projecting away from the substantially planar face are provided at the axially opposite ends of the recess 15, and a pair of parallel lugs 18 also projecting away from the substantially planar face are provided at circumferentially spaced positions at opposite sides of the recess. The lugs 18 are machined in adjacent faces to provide two flat parallel guiding surfaces 19 which engage slidably with complementary flat parallel guiding surfaces 20 on opposite sides of the carrier 10. At their radially outermost and uppermost ends the guiding surfaces 19 lead into flat bearing surfaces 21 positioned substantially normal to the guiding surfaces 19. The surfaces 21 engage slidably with complementary shoulders 22 on the carrier which are continuous with the guiding surfaces 20. The guiding surfaces 20 are continued in an axial direction by circumferentially spaced outer surfaces of spaced parallel arms 23 integral with and extending forwardly from the carrier but terminating short of the face of the disc 11, adjacent to the carrier.

The opposed adjacent faces of the lugs 16 and 17 are machined to provide parallel abutment surfaces 24 lying at right angles to the flat parallel guiding surfaces 19 of the lugs 18.

The opposite ends of the lugs 16 and 17 or each pair are spaced inwardly from the inner opposed parallel faces of the lugs 18 of the other pair so that machining of the guiding surfaces 19, 21, and the abutment surfaces 24 can be carried out in two separate machining operations, in directions at right angles to each other, and without interfering with the lugs of the other pair.

A friction pad 25 for engagement with the face of the disc adjacent to the carrier 10 is bonded or otherwise secured to a rigid backing plate 26 having parallel end edges. The pad assembly comprising the pad 25 and backing plate 26 is guided for movement towards and away from the disc by the sliding engagement of the end edges of the backing plate 26 with complementary guiding surfaces 27 of substantial depth on the adjacent inner sides of the arms 23.

A friction pad 28 for engagement with an opposite face of the brake disc 11 is bonded or otherwise secured to a rigid backing plate 29, this friction pad assembly comprising the friction pad 28 and the backing plate 29 is located in the recess 15 in the yoke and the backing plate is engaged by the machined abutment surfaces 24 of the adjacent lug 16, to which it is spigotted by a pair of removable pins 29a.

The friction pad 25 is directly applied to the brake disc by a piston 30 working in the cylinder 13, and an opposed piston 31 acts on the yoke through the lug 17 to bring the friction pad 28 into engagement with the opposite face of the disc when the pistons are separated by pressure fluid forced between them from a master cylinder or other source of fluid under pressure.

The directly actuated friction pad 25 is held against movement in a radial direction by the engagement in an opening 32 in the backing plate 26 with an axially extending spigot portion 33 on the outer end of the piston 30.

The yoke 14 is similarly located by the engagement, in an opening 17a, in the lug 17, of a spigot portion 34 on the outer end of the piston 31. The spigot portion 34 at its inner end is surrounded by an annular thrust face 35 which engages with the bearing surface on the lug 17 to apply a thrust to the yoke when the brake is applied.

A resilient annular sleeve 34a of a synthetic plastics material is interposed between the spigot portion 34 and the opening 17a to compensate for tolerance variations therebetween.

The drag on the directly actuated friction pad 25 when the brake is applied is taken by one or other of the arms 23 on the stationary carrier 10 according to the direction of rotation of the disc and the drag on the friction pad 28 is taken through the yoke on the outer surface of the other arm.

The yoke 14 is resiliently urged into engagement at all times with the shoulders 22 on the carrier 10 by means of a compression spring 36 surrounding a stud 37 secured in the carrier and extending through an axially slotted opening 38 in the yoke. The spring acts between complementary retaining plates 39, 40 of which the lowermost plate 39 engages with the base of a recess 38a in the yoke surrounding the opening 38 and the uppermost plate 40 is held in position by a circlip or a removable split pin 41 engaging with a portion of the stud 37 which projects outwardly from the retaining plate 40.

When the friction pads 25 and 28 are worn and have to be replaced the pins 29a are removed to permit the friction pad 25 to be withdrawn from the brake in a radially downwards direction. After removal of the split pin 41 the yoke 14 can be removed in a radial direction after moving it axially to disengage the lug 17 from the spigot portion 34 on the outer end of the piston 31. Thereafter the friction pad 25 can be removed after forcing back the piston 30.

In a modification the stud 37 is replaced by a headed stud and a helical spring acts between the base of the recess surrounding the slotted opening 38 in the yoke 14 and the head of the stud.

In another construction the yoke 14 is held in engagement with the shoulder 22 on the carrier 10 by means of a pair of tension springs positioned at the circumferentially opposed opposite ends of the brake. The tension springs are connected between pegs extending outwards from the outer faces of the arms 23 on the carrier and points on the yoke 14 located radially outwards from the pegs on the carrier.

The brake shown in FIGS. 5 to 9 is similar to that shown in FIGS. 1 to 4 and corresponding reference numerals have been used, where appropriate, to indicate corresponding parts.

In this construction however at their radially innermost ends the guiding surfaces 19 on the carrier 10 lead into opposed outwardly directed aligned shoulders or steps 45 with which slidably engage machined edges 46 on the lowermost ends of the lugs 18 on the yoke 14, which define the bearing surfaces.

The yoke 14 is resiliently urged inwardly into engagement with the shoulders or steps 45 on the carrier by a spring plate 47. As illustrated in FIGS. 7 and 8 the spring plate 47 acts between the outer surface of the yoke 14 and the under surface of the head 48 of a bolt 49 projecting through the slotted opening 38 in the yoke and screwed into a central boss 50 in the radially uppermost part of the carrier 10.

In the modification shown in FIG. 9 the bolt comprises a bleed screw 51 for bleeding the hydraulic system, and particularly the pressure space in the cylinder bore 13 between the pistons 30 and 31.

The modified brake illustrated in FIGS. 10 and 11 is similar to the construction described above with reference to FIGS. 1 to 4 of the drawings, and corresponding reference numerals have been used to indicate corresponding parts. However, in this construction, the resilient means 36 urging the yoke 14 into engagement with the shoulders 22 on the carrier have been omitted. Movement of the yoke 14 relative to the carrier 10 in a radially outward direction is prevented by the sliding engagement of the inner bearing surfaces 60 of inward extensions 61 at the lower ends of the lugs 18 of the yoke with guiding surfaces 62 at the lower ends of the arms 23 on the carrier 10. The guiding surfaces 62 are parallel to the shoulders 22, and the lugs 18 are formed as ears having parallel internal end surfaces forming the bearing surfaces 21 and 60.

In a modification the arms 23 incorporate at aligned intermediate points in their radial lengths, outwardly extending parallel ended lugs adapted to be engaged slidably with the parallel internal bearing surfaces 21 and 61 defining spaced upper and lower walls of aligned recesses in the ears of lugs 18 on the yoke.

The construction in accordance with FIGS. 10 and 11 and the modification to it described above does not depend upon resilient means for holding the yoke in position in the stationary member. This has the advantage over the construction described above with reference to FIGS. 1 to 9 where failure of the resilient means in service may cause the yoke to become detached from the stationary member.

In any of the embodiments described above where the yoke 14 is constructed from a casting, it is convenient for the casting to be of a hollow construction thereby reducing to a minimum the weight of the disc brake assembly.

In any of the embodiments described above anti-wear devices, for example in the form of wear resistant strips, may be interposed between the complementary guiding surfaces 19 and 20.

I claim:

1. A yoke for use in a disc brake of the type comprising a rotatable disc having first and second opposite faces, first and second friction pad assemblies for engagement respectively with said first and second opposite faces of said disc, a stationary member mounted adjacent to said first face of said disc, a yoke extending over a portion of the periphery of said disc and mounted for sliding movement relative to said stationary member, and an hydraulic actuator adapted to apply said first friction pad assembly directly to said first face of said disc and adapted to apply said second friction pad assembly to said second face of said disc through said yoke, said yoke comprising a one-piece assembly having on one side a substantially planar face adapted to substantially encompass the stationary member and a portion of the periphery of the disc and including a first pair of spaced parallel lugs which both project away from the substantially planar face of the yoke in the same direction and having inner adjacent surfaces defining a pair of spaced flat parallel guiding surfaces of substantial radial depth for direct operative engagement with complementary flat guiding surfaces on opposite sides of the stationary member, said first pair of guiding surfaces on said yoke at least at one pair of corresponding ends leading into opposed bearing surfaces for engagement with complementary shoulders on the stationary member, and a second pair of spaced parallel lugs which project away from the substantially planar face of the yoke in the same direction as said first pair and which are spaced outwardly beyond the outer opposite ends of said lugs of said first pair, opposite ends of said lugs of said second pair being disposed between and located inwardly from spaced parallel planes containing said flat parallel guiding surfaces of said lugs of said first pair, and adjacent inner surfaces of said lugs of said second pair defining abutment surfaces for engagement with the second friction pad assembly and with the hydraulic actuator.

2. A yoke as claimed in claim 1, wherein said first pair of lugs are located at circumferentially spaced positions on opposite sides of a central recess in said yoke, said central recess being adapted to accommodate the stationary member and the portion of the periphery of the disc, and said second pair of lugs are located at axially opposite ends of said recess.

3. A yoke as claimed in claim 1, wherein said bearing surfaces are located at the radially outermost ends of said parallel guiding surfaces and extend towards each other.

4. A yoke as claimed in claim 1, wherein said bearing surfaces are located at the radially innermost ends of said parallel guiding surfaces and extend away from each other in opposite directions.

5. A yoke as claimed in claim 1, wherein the yoke is constructed from a hollow casting.

6. A yoke as claimed in claim 1, wherein said bearing surfaces are located at the radially innermost and outermost ends of the parallel guiding surfaces, and each pair of bearing surfaces are adapted to straddle and engage slidably with complementary spaced shoulders on arms on the stationary member.

7. A disc brake comprising a rotatable disc having first and second opposite faces, first and second friction pad assemblies for engagement respectively with said first and second opposite faces of said disc, a stationary member mounted adjacent to said first face of said disc, a yoke extending over a portion of the periphery of the disc and mounted for sliding movement relative to said stationary member, and an hydraulic actuator adapted to apply said first friction pad assembly directly to said first face of said disc and adapted to apply said second friction pad assembly to said second face of said disc through said yoke, said yoke comprising a one-piece assembly having on one side a substantially planar face substantially encompassing said stationary member and said portion of the periphery of said disc, said yoke including a first pair of spaced parallel lugs which both project away from the substantially planar face of said yoke in the same direction and of which the inner adjacent surfaces comprise a pair of spaced parallel guiding surfaces of substantial radial depth having a direct operative engagement with complementary flat guiding surfaces on opposite sides of said stationary member, and a second pair of spaced parallel lugs at right angles to said first pair and projecting away from the substantially planar face of said yoke in the same direction as said first pair, said lugs of said second pair being spaced outwardly beyond the outer opposite ends of said lugs of said first pair and being disposed between and located inwardly from spaced parallel planes containing said flat parallel guiding surfaces of said lugs of said first pair, and the adjacent inner faces of said lugs of said second pair defining abutment surfaces engaging respectively with said second friction pad assembly and with said hydraulic actuator, and wherein said parallel guiding surfaces at their outermost and uppermost ends lead into opposed bearing surfaces engaging with complementary shoulders on said stationary member, and resilient means acting between said yoke and said stationary member to urge said bearing surfaces into engagement with said shoulders.

8. A disc brake as claimed in claim 7, wherein said resilient means comprise a coiled compression spring.

9. A disc brake as claimed in claim 7, wherein wear resilient devices are interposed between said spaced parallel guiding surfaces on said yoke and said complementary guiding surfaces on said stationary member.

10. A disc brake as claimed in claim 7, wherein said hydraulic actuator comprises a pair of opposed pistons working in a cylindrical bore in the stationary member and one of the pistons acts directly on one of said second pair of lugs on said yoke to move said yoke in a direction to apply said second friction pad assembly to the disc, the said one piston having a spigot portion located in an opening in the said one of said second pair of lugs, and a resilient annular sleeve being located between the opening and said spigot portion to compensate for tolerance variations between said spigot portion and said opening.

11. A disc brake as claimed in claim 10 wherein said resilient sleeve is constructed from a synthetic plastics material.

12. A disc brake as claimed in claim 7, wherein said resilient means comprise a compression spring acting between the outer end of a stud secured in said stationary member and extending radially outwardly through an axially slotted opening in said yoke.

13. A disc brake as claimed in claim 12, wherein said compression spring acts between spaced retaining plates of which the lowermost plate engages with the base of a recess in said yoke surrounding said opening and the uppermost retaining plate abuts against a spring ring retainer secured to the stud adjacent to its outermost end which projects above said yoke.

14. A disc brake as claimed in claim 12, where said compression spring acts between the base of a recess surrounding said opening and the head of a stud secured in said stationary member and projecting through said opening with said head located above said yoke.

15. A disc brake as claimed in claim 7, wherein said resilient means comprise a plate spring acting between said yoke and the head of a stud screwed into said stationary member through an axially extending opening in said yoke.

16. A disc brake as claimed in claim 15, wherein said hydraulic actuator comprises a pair of opposed pistons working in a cylinder bore in said stationary member and said stud comprises a screw through which at least the pressure space in said cylinder bore between said opposed pistons can be bled.

17. A disc brake comprising a rotatable disc having first and second opposite faces, first and second friction pad assemblies for engagement respectively with said first and second opposite faces of said disc, a stationary member mounted adjacent to said first face of said disc, a yoke extending over a portion of the periphery of said disc and mounted for sliding movement relative to said stationary member, and an hydraulic actuator adapted to apply said first friction pad assembly directly to said first face of said disc and adapted to apply said second friction pad assembly to said second face of said disc through said yoke, said yoke comprising a one-piece assembly having on one side a substantially lunar face substantially encompassing said stationary member and said portion of said periphery of said disc, said yoke including a first pair of spaced parallel lugs which both project away from the substantially planar face of said yoke in the same direction and of which the inner adjacent surfaces comprise a pair of spaced flat parallel guiding surfaces of substantial radial depth having a direct operative engagement with complementary flat guiding surfaces on opposite sides of said stationary member, and a second pair of spaced parallel lugs at right angles to said first pair and projecting away from the substantially planar face of said yoke in the same direction as said first pair, said lugs of said second pair being spaced outwardly beyond the outer opposite ends of said lugs of said first pair and being disposed between and located inwardly from spaced parallel planes containing said flat parallel guiding surfaces of said lugs of said first pair, and the adjacent inner faces of said lugs of said second pair defining abutment surfaces engaging respectively with said second friction pad assembly and which said hydraulic actuator, and wherein bearing surfaces at the radially innermost and outermost ends of said parallel guiding surfaces straddle and engage slidably with complementary spaced shoulders on arms on opposite sides of said stationary member.

18. A disc brake as claimed in claim 17, wherein said shoulders on said stationary member are located at radially opposite ends of each arm.

19. A disc brake as claimed in claim 17, wherein said shoulders on said stationary member are located at radially opposite ends of opposed lugs extending outwardly from the arms.

20. A disc brake as claimed in claim 17, wherein wear resistant devices are interposed between the spaced parallel guiding surfaces on the yoke and the complementary guiding surfaces on the stationary member.

21. A disc brake as claimed in claim 17, wherein said hydraulic actuator comprises a pair of opposed pistons working in a cylinder bore in said stationary member and one of the pistons acts directly on one of said second pair of spaced lugs on said yoke to move said yoke in a direction to apply said second friction pad assembly to the disc, the said one piston having a spigot portion located in an opening in the said one of said second pair of lugs, and a resilient annular sleeve being located between said opening and said spigot portion to compensate for tolerance variations between said spigot portion and said opening.

22. A disc brake as claimed in claim 21, wherein said resilient sleeve is constructed from a synthetic plastics material.

* * * * *